US006883860B1

(12) United States Patent
Budge

(10) Patent No.: US 6,883,860 B1
(45) Date of Patent: Apr. 26, 2005

(54) KIT AND METHOD FOR TRUCK CAB CONVERSION

(75) Inventor: Darryl Budge, Winnipeg (CA)

(73) Assignee: East Side Heavy Truck Collision, Winnipeg (CA)

( * ) Notice: Subject to any disclaimer, the term of this patent is extended or adjusted under 35 U.S.C. 154(b) by 0 days.

(21) Appl. No.: 10/724,699

(22) Filed: Dec. 2, 2003

(51) Int. Cl.[7] .................................................. B60J 7/00
(52) U.S. Cl. .............................. 296/190.08; 296/190.02; 296/26.08
(58) Field of Search ..................... 296/190.08, 190.02, 296/180.2, 180.1, 165, 180.4, 100.06, 190.01, 26.08; 180/89.12; 29/401.1

(56) References Cited

U.S. PATENT DOCUMENTS

| | | | | |
|---|---|---|---|---|
| 2,591,380 A | * | 4/1952 | Schreiner | 296/186.5 |
| 2,816,794 A | * | 12/1957 | Temp | 296/190.08 |
| 3,339,967 A | * | 9/1967 | Harris | 296/190.08 |
| 3,551,014 A | * | 12/1970 | Valdimirovich | 296/191 |
| 3,558,180 A | * | 1/1971 | Algire | 296/174 |
| 3,572,810 A | * | 3/1971 | Arakellan | 296/190.08 |
| 4,050,735 A | * | 9/1977 | Molnar | 296/190.08 |
| 4,589,181 A | * | 5/1986 | Phillips | 29/401.1 |
| 4,599,780 A | * | 7/1986 | Rohrbacher | 296/26.08 |
| 4,605,257 A | * | 8/1986 | Lang et al. | 296/190.08 |
| 4,842,326 A | * | 6/1989 | DiVito | 296/193.04 |
| 5,310,239 A | * | 5/1994 | Koske et al. | 296/190.02 |
| 5,560,673 A | * | 10/1996 | Angelo | 296/190.02 |
| 5,735,568 A | * | 4/1998 | Arnold | 296/190.02 |
| 5,947,549 A | * | 9/1999 | Finley | 296/190.08 |
| 6,076,884 A | * | 6/2000 | Osman | 296/190.08 |
| 6,178,612 B1 | * | 1/2001 | Gernstein | 296/190.02 |
| 6,276,748 B1 | * | 8/2001 | Gobessi et al. | 296/26.08 |
| 6,520,565 B1 | * | 2/2003 | Kjellberg | 296/190.08 |
| 6,557,230 B1 | * | 5/2003 | Gernstein | 296/190.02 |
| 6,625,860 B1 | * | 9/2003 | Gernstein | 296/190.02 |
| 6,719,361 B1 | * | 4/2004 | Adams et al. | 296/190.01 |
| 2002/0167190 A1 | * | 11/2002 | McElwee et al. | 296/77.1 |
| 2003/0025357 A1 | * | 2/2003 | Fischer et al. | 296/190.08 |
| 2003/0234556 A1 | * | 12/2003 | Baggett et al. | 296/190.02 |

* cited by examiner

*Primary Examiner*—Kiran Patel
(74) *Attorney, Agent, or Firm*—Ryan W. Dupuis; Adrian D. Battison; Michael R. Williams

(57) ABSTRACT

A kit of parts including shortened side panels and a roof panel is provided for installation on a highway truck tractor which is being converted from a sleeper cab configuration to a day cab configuration. The kit of parts is particularly useful when converting an integral sleeper cab which requires that the frame and floor be shortened before installation of the components of the conversion kit. When the replacement components are provided in the form of a kit, conversions from sleeper cab to day cab can readily be accomplished in a cost effective manner to realize many benefits recognized with conversion from sleeper cabs to day cabs already being done with non-integral types of sleeper cabs.

20 Claims, 4 Drawing Sheets

KIT AND METHOD FOR TRUCK CAB CONVERSION

FIELD OF THE INVENTION

The present invention relates to a kit for conversion of the cab unit on a highway tractor truck from a sleeper cab including an extension for beds therein to a day cab in which the cab terminates rearward of the seat of the driver.

BACKGROUND

One-piece integral sleeper cabs have become very popular in the trucking industry. Integral cabs, because of their one-piece construction, are roomier, quieter and offer a smoother ride than traditional sleeper cabs. In recent years, one of the most popular integral cabs is the model manufactured by Volvo™ Trucks.

Traditionally, carriers run their highway trucks hard for a three-year period, after which, they are converted to day cabs and put on routes that are closer to home base so that the mileage count slows. After a couple years of service in this role, the truck has a maximum trade-in value.

The problem with integral sleeper cabs and especially the Volvo™ units is that, because of their one-piece construction, it has typically not been possible to convert them into day cabs. While individual custom alterations of various types of vehicles are known, such alterations are more costly than any benefits achieved from the conversion process when applied to integral sleeper cabs.

SUMMARY

According to one aspect of the present invention there is provided a method of conversion of a cab of a highway truck tractor from a sleeper cab configuration to a day cab configuration, the method including:

removing an existing roof of the cab;
 removing existing side panels of the cab;
 removing interior finishing of the cab;
 shortening a floor of the cab;
 shortening a frame of the cab;
 providing a kit including replacement side panels which are narrower than the existing side panels and a replacement roof which is shorter in length and height than the existing roof;
 installing the replacement side panels on the shortened frame of the cab;
 installing the replacement roof on the shortened frame of the cab; and
 installing modified interior finishing in the cab.

The present invention provides a system whereby a kit of moulded fibreglass parts form an integral day cab that replaces the Volvo™ integral sleeper cab. The kit of parts encompasses the remainder of the day cab components that features extra storage space, which is always popular with professional drivers. Once converted, these popular highway trucks can become popular day units and their resale value will rise accordingly.

According to the method of conversion, no sectioning of floor pans or support rails is required. The factory rear panel is re-used in full and the aftermarket kit can be installed using similar adhesion procedures as factory processes. The smart interior has drawn nods of approval from Volvo™ officials and drivers, alike. Most important for Volvo™ enthusiasts, the conversion unit maintains the popular Volvo™ image, integrity and performance.

By using the kit according to the method described herein, a standardised conversion process is achieved in which costs can be reduced so that the benefits of converting a cab from a sleeper to a day cab configuration can be realised in a cost effective manner.

The replacement roof preferably has a matching contour to the existing roof to be aesthetically similar in appearance.

When the kit is applied to a cab including extensions extending rearwardly from the cab in the form of side extensions extending rearwardly from the existing side panels, upper extensions extending rearwardly from the roof above the side extensions and lower extensions extending rearwardly below the side panels, the method preferably includes providing replacement upper extensions and replacement lower extensions in the kit, installing the replacement upper extensions above the existing side extensions rearwardly of the roof and installing the lower extensions below the existing side extensions.

When the cab includes a rear frame connected to side beams and floor beams extending in the longitudinal direction of the cab, the method may include removing a section from the side end floor beams and reconnecting the existing rear frame when shortening the frame of the cab.

Sections from the beams are preferably removed in such a manner that a small portion of each beam remains adjacent the rear frame for reconnection of the beams using a lap weld.

The remaining portions of the beams may be deformed before reconnection for forming the lap weld in which one portion of the beam is inserted into the other.

The floor beams are preferably cut ahead of the shortened floor of the cab so that the floor projects rearwardly beyond the cut floor beams before reattachment of the rear panel.

When the cab includes a factory lap joint formed therein, the method may include shortening the floor of the cab by separating the floor at the factory lap joint by keeping an existing portion of the floor and removing a rearward portion of the floor beyond the factory lap weld.

The existing lower fairings may also be removed and replaced with lower fairings which are shorter in length in relation to the existing fairings. Alternatively, the lower fairings may be cut to be shorter in length before reinstalling the fairings.

The existing side panels may be removed by drilling out spot welds securing the panels to the frame of the cab.

The method preferably also includes relocating suspension of the cab adjacent the rear panel thereof forwardly when the frame of the cab is shortened.

Modified interior finishing installed in the cab includes the existing interior finishing of the cab which has been trimmed before reinstallation.

According to a second aspect of the present invention there is provided a kit for conversion of a cab of a truck from a sleeper cab configuration in which the cab extends rearwardly from an occupant seat of the cab, existing side panels span rearwardly from respective doors of the cab to an existing rear panel of the cab, and a roof of the cab extends upwardly and rearwardly above the existing side panels to a day cab configuration in which the cab is shorter in length than the sleeper cab configuration, the kit comprising:

replacement side panels which are narrower between respective forward and rearward edges than the existing side panels, the forward and rearward edge being configured similarly to the existing side panels; and
 a replacement roof which is shorter in length and shorter in height than the existing roof.

The replacement roof preferably has a matching contour to the existing roof to be aesthetically similar in appearance.

The replacement side panels and the replacement roof are preferably formed of molded fibreglass.

When the cab includes existing fairings extending below the existing side panels, the kit preferably includes replacement fairings which are shorter in length than the existing fairings.

When the cab has existing extensions projecting rearwardly from opposing sides of the cab, the kit preferably includes upper extensions being similar in width to the existing extensions and being similar in height to the replacement roof. The kit preferably also includes lower extensions being similar in width to the existing extensions and being similar in height to the existing panels below the respective doors of the cab.

BRIEF DESCRIPTION OF THE DRAWINGS

In the accompanying drawings, which illustrate an exemplary embodiment of the present invention.

DETAILED DESCRIPTION

Figure 1:
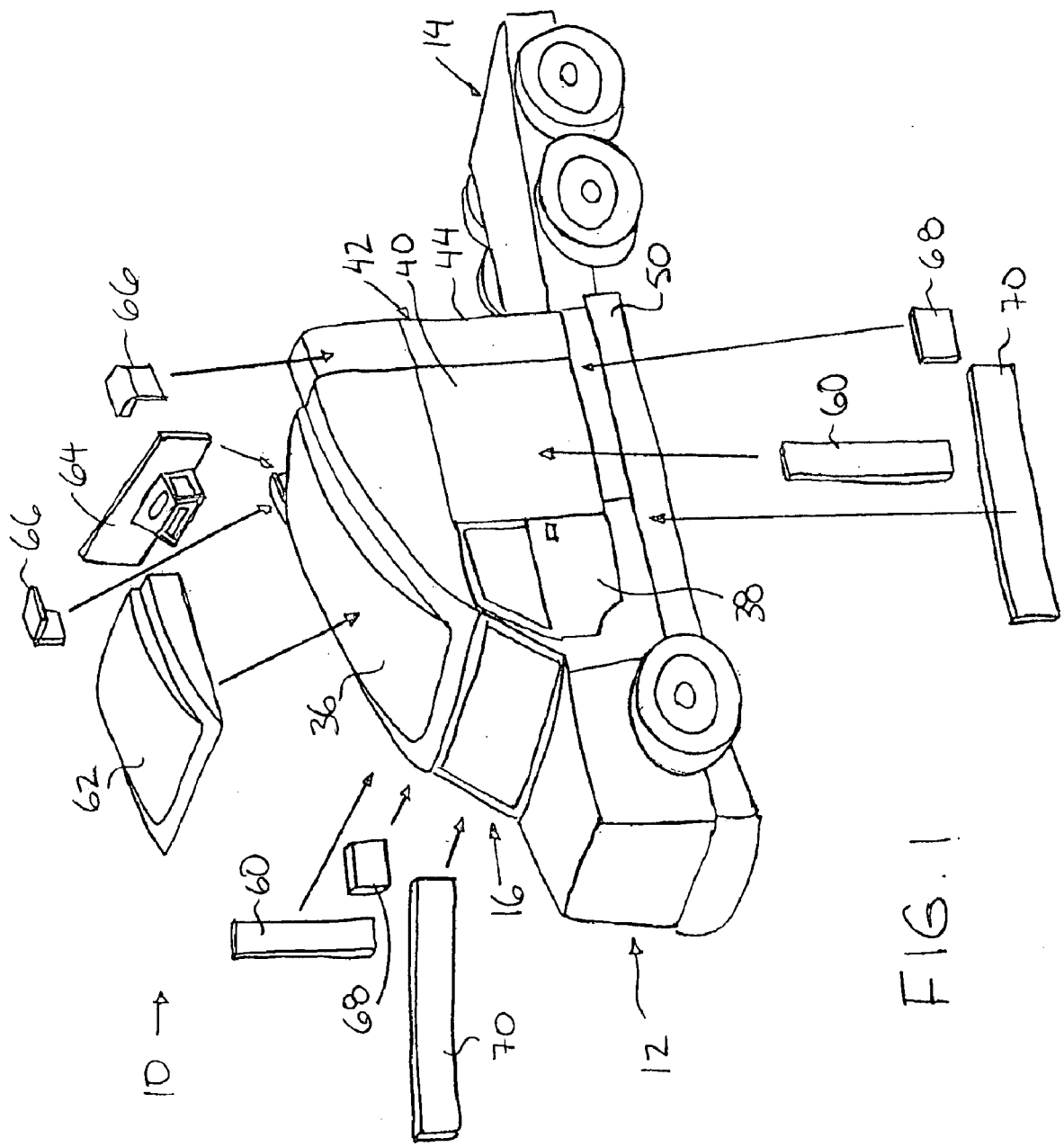
FIG. 1 is a perspective view of a highway truck tractor with an integral sleeper cab with the components of the conversion kit adjacent thereto.

Referring to the accompanying drawings, there is illustrated a kit generally indicated by reference numeral 10. The kit 10 is used for conversion of a highway truck tractor, of the type used for towing large trailers on highways, from a sleeper cab configuration to a day cab configuration. The conversion kit 10 is particularly suited for conversion of vehicles having an integral cab, for example those available by Volvo™ trucks.

The vehicle 12 to be converted is a highway truck tractor having a chassis 14 supported for rolling movement along a road. The cab 16 has a frame 18 including a pair of front pillars 20 at the front corners of the cab, a pair of rear pillars 22 at respective rear corners of the frame and a pair of middle pillars 24 locked intermediately of the front and rear pillars on each side of the vehicle respectively along a rear edge of the respective doors of the cab. Two roof beams 26 are interconnected between the top ends of the pillars along each side of the frame and a plurality of floor beams 28 span between the front and rear ends of the frame along a bottom side thereof. Suitable cross braces are provided between respective top and bottom ends of opposing pairs of the pillars. Side beams 30 span between the middle pillar 24 and the rear pillar 22 on each side of the cab at an intermediate location spaced between the top and bottom ends of the pillars.

A floor panel is provided having a front portion 32 spanning generally between the front and middle pillars and a rear portion 34 spanning generally between the middle pillars and the rear pillars. A rear edge of the front panel 32 is raised slightly to overlap the front edge of the rear portion 34 forming a factory lap joint connected by spot welds at spaced positions therealong.

A plurality of outer skin panels are provided which enclose the frame 18. A roof panel 36 includes an outer shell extending upwardly and rearwardly along a top side thereof and an inner shell defining an interior ceiling of the cab. Doors 38 are provided which generally span between the front pillars 20 and the middle pillars 24 along each side of the cab. Existing side panels 40 span between the middle pillars 24 and the rear pillars on each side of the cab. An existing rear panel 42 spans between the rear pillars 22 of the frame.

A cab extension 44 is provided which extends rearwardly from the rear panel along the side and top edges to provide an aesthetically pleasing cover to hide components of the vehicle including a muffler stack and suspension component and the like. The extensions 44 include a middle section which matches the side panel 40, upper sections which match the rear of the roof 36 and lower sections which match the trim panels below the door of the cab.

Suspension of the frame 18 on the chassis includes fixed supports at a front end of the frame to couple the frame to the chassis. An air ride suspension 48 supports the rear portion of the frame of the cab on the chassis in a manner which permits some restricted deflection and movement therebetween.

Additional components include a fairing 50 in the form of a trim panel which spans alongside the chassis below the components of the cab noted above. The interior of the cab is finished with seats, dashboard trim and interior trim panels in a conventional manner. In the sleeper cab configuration the rear pillars are spaced sufficiently rearwardly of the middle pillars 24 to provide space therein for occupants to lay down for sleeping, positioned rearwardly of the driver in occupant seats which are generally located between the front and middle pillars of the vehicle.

The conversion kit 10 includes replacement side panels 60 which are narrower than the existing side panels 40 of the sleeper cab configuration. The replacement side panels 60 have the same profile and contour along a front edge as the door similar to the existing side panels while also matching at a rear edge to the middle sections of the extension 44 similarly to the existing side panels.

The kit further includes a replacement roof 62 which is shorter in overall length and height than the existing roof but similarly slopes rearwardly and upwardly following a similar profile and contour as the existing roof. The roof 62 is formed in two pieces including an outer shell forming the outer shape of the roof and an inner component 64 which is received within the outer shell for defining the interior ceiling of the finished cab.

The kit also includes upper extensions 66 and lower extensions 68 for replacing the existing upper and lower sections of the extension 44 of the sleeper cab. The main portion of the extension 44 is reused and extends rearwardly from the sides 60. The upper extensions 66 are formed to be continuous with the profile and height of the replacement roof 62 extending above the sides 60 of the converted cab. The lower extensions 68 are shortened in relation to the lower sections of the existing extension to accommodate for a shortened cab length. Profile of the lower extensions is matching to the profile of the lower trim panels spanning below the doors on each side of the cab. Replacement fairings 70 are also provided in the kit, which are similarly shorter in length than the existing fairings 50.

Figure 2:
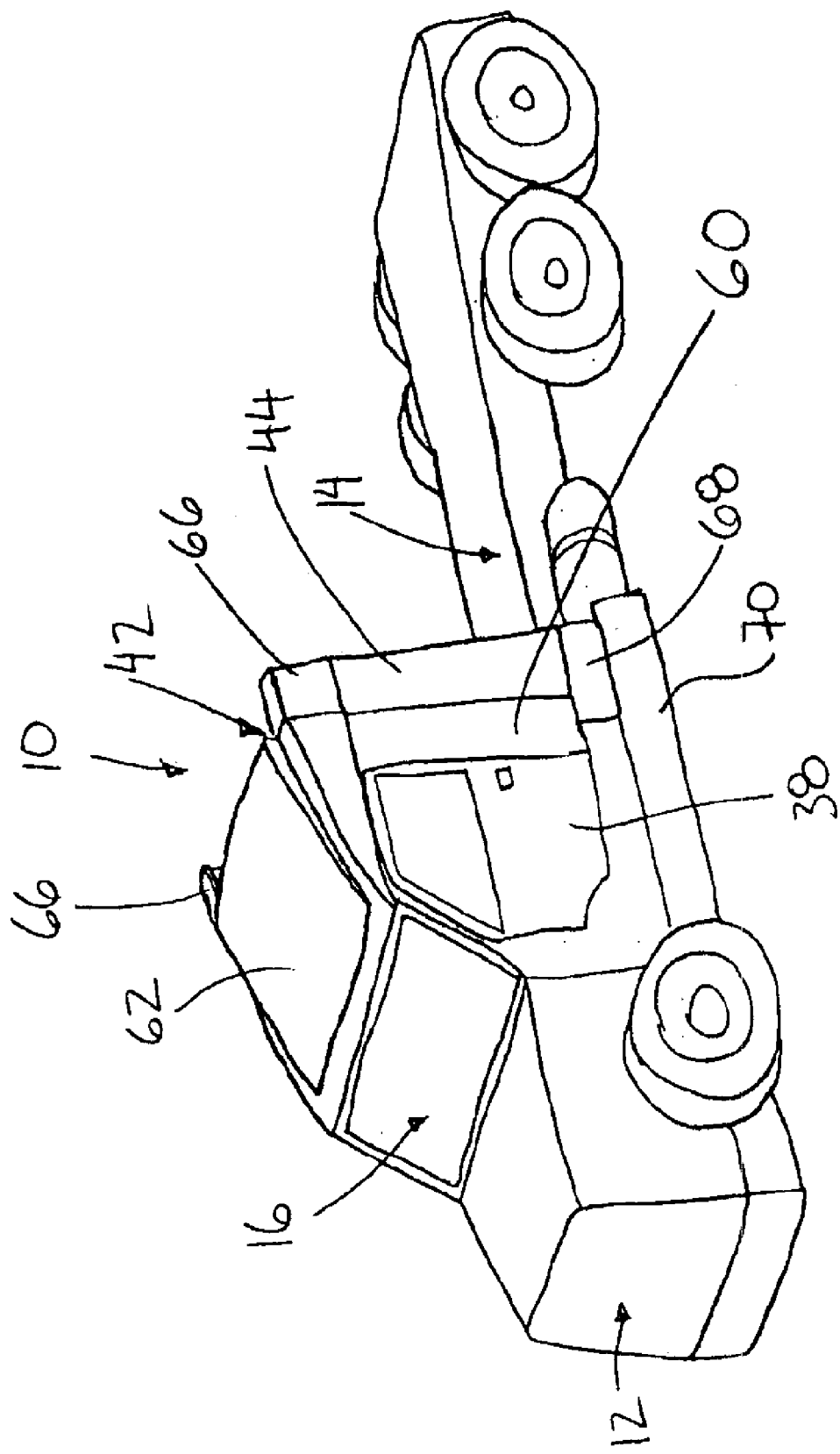
FIG. 2 is a perspective view of the highway truck tractor in which the sleeper cab has been modified with the components of the kit installed thereon to form a day cab.

In general the components of the kit are moulded of fibreglass having a profile and shape which matches the existing components to be replaced while being different in scale or in certain dimensions to accommodate for a shortened frame of the cab as illustrated in the day cab configuration of FIG. 2. The components are particularly suited for replacing components described above relating to integral sleeper cab models of Volvo™ trucks.

The method of converting a truck from a sleeper cab configuration to a day cab configuration, in which the rear panel is moved forwardly in relation to the sleeper cab configuration so as to be positioned rearwardly of the drivers seat, involves first stripping the interior components of the vehicle including the seats, and trim panels forming the walls, floor, and ceiling. The interior components are set aside for later reuse after trimming. Components of the extension 44 are also removed and set aside for later use.

Figure 3B:
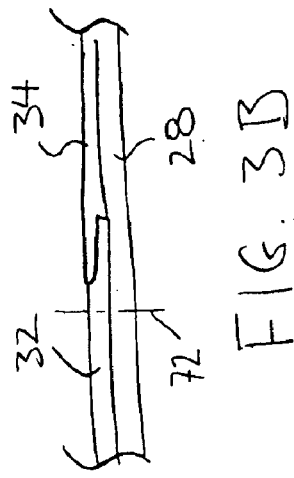
FIG. 3B is a sectional view of the lap joint of the floor of the truck.
Figure 3C:
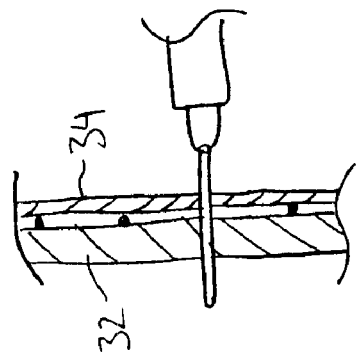
FIG. 3C is a sectional view illustrating the spot welds being drilled out at the factory lap joint in the floor.
Figure 3A:
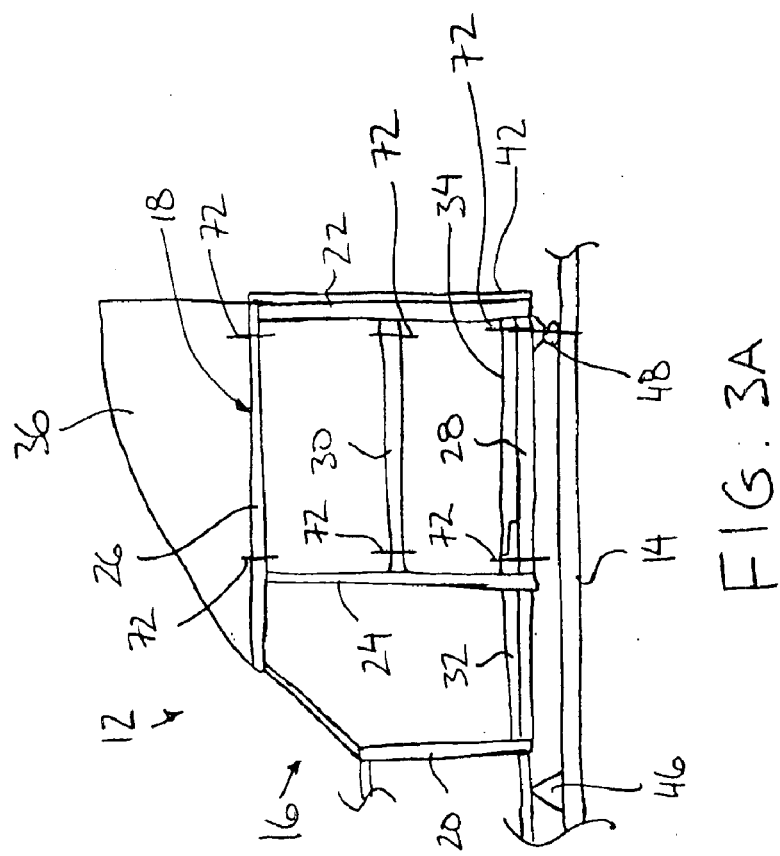
FIG. 3A is a schematic side elevational view of the frame of the cab.

Disassembly of the outer components of the vehicle begins by removing the roof, including both the inner and outer components of the existing roof. The existing side panels 40 are then removed by drilling out any spot welds which support the panels. The rear portion 34 of the floor panel is similarly removed by drilling out the spot welds along the lap welded joint as illustrated in FIG. 3C. Accordingly the floor of the cab is shortened to generally span only between the front and middle pillars once the rear portion is removed.

By separating the floor at the factory weld, the floor thus terminates slightly rearwardly of the middle pillars 24 which is adjacent the rear panel in the reassembled day cab configuration.

In order to advance the rear panel forwardly, the roof beams 26, the side beams 30 and the floor beams 28 are each cut at cut lines 72 so as to remove a section therefrom between the middle and rear pillars to remove a section of length from all frame members spanning the sleeper cab portion rearwardly of the driver seats. Location of the cut lines 72 are positioned to be either slightly forwardly of the middle pillars 24 at a front end of the sections to be removed or slightly forwardly of the rear pillars at a rear end of the sections to be removed such that a small portion in the order of a couple of inches remains of each beam at the pillars for reattachment to one another.

The cut lines at the forward ends of the sections to be removed from the floor beams 28 are located slightly ahead of the rear edge of the front portion 32 of the floor panel which remains so that the floor panel can overlap the remaining portions of the floor beams 28 directly adjacent the rear panel to produce a lap weld of the floor 32 overtop of the remaining portions of the floor beams connected to the rear panel upon reassembly.

Figure 4B:
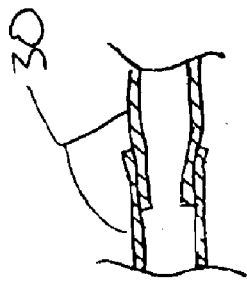
FIG. 4B is a sectional view of a lap joint reassembling the beams into the day cab configuration.
Figure 4C:
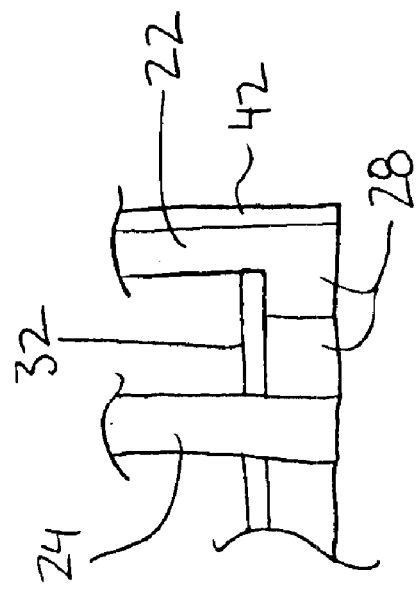
FIG. 4C is a sectional side elevational view of the lap joint of the floor adjacent the rear panel of the day cab.
Figure 4A:
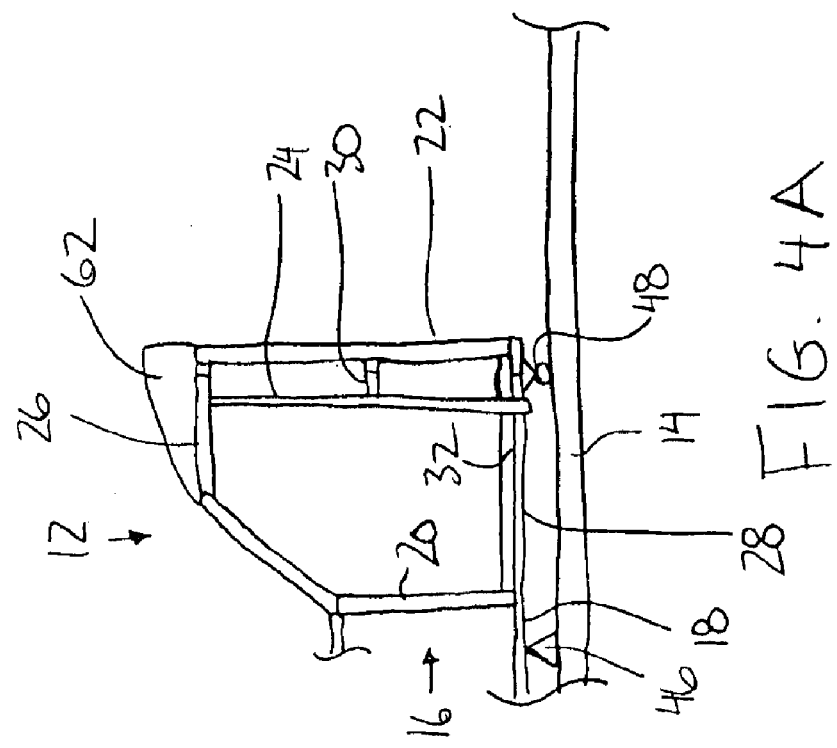
FIG. 4A is a schematic side elevational view of the frame of the cab after shortening according to the conversion of the present invention.

Once the sections of the beams are removed the remaining rear and front ends of the beams are suitably deformed so that one can be slightly received within the other to form a lap weld as illustrated in FIG. 4B. The techniques for forming the lap weld are consistent with safety standards applicable to highway truck tractors. Locations of the cut lines 72 thus ensures that the substantial portion of each beam spanning between the middle and rear pillars is removed.

The rear pillars 22 and cross braces along with the rear panel spanning there across are all reused an reconnected using lap joints at the beams which have been sectioned so that the rear panel in the day cab configuration is thus positioned rearwardly adjacent to the driver seats directly rearwardly of the middle pillars 24 such that the space occupied by the middle and rear pillars 24 provides some small storage space directly adjacent the rear of the driver seats.

Once the frame has been shortened the components of the conversion kit 10 can be installed. The replacement sides 60 and replacement roof 62 are attached using conventional means. The middle sections of the extensions 44 are reused and are abutted adjacent the rearward edge of the replacement side panels 60. The upper extensions 66 and lower extensions 68 of the kit are thus installed for replacement of the existing corresponding components. The lower fairings 70 which are shorter in length than the existing fairings 50 are also thus installed to complete the exterior appearance of the vehicle.

In a further embodiment the existing fairings 50 may be cut shorter to form the replacement fairings 70, however the preferred method involves moulding replacement fairings of fibreglass for reducing cost. The interior trim panels may then be attached. Modification such as trimming and the like may be required and can be performed as necessary.

Before finishing of the interior and mounting of the exterior panels of the kit, some of the functional components of the vehicle may require some modification. In particular the air ride suspension 48 which supports the rear portion of the cab on the chassis is moved forwardly for supporting the rear of the cab thereon in the new position of the rear panel positioned forwardly in relation to the existing position of the rear of the sleeper cab. Addition components such as the muffler is also moved forwardly to be positioned directly adjacent the new location of the rear panel positioned forwardly in relation to the sleeper cab configurations.

While one embodiment of the present invention has been described in the foregoing, it is to be understood that other embodiments are possible within the scope of the invention. The invention is to be considered limited solely by the scope of the appended claims.

What is claimed is:

1. A method of conversion of a cab of a highway truck tractor from a sleeper cab configuration to a day cab configuration, the method including:
   removing an existing roof of the cab;
   removing existing side panels of the cab;
   removing interior finishing of the cab;
   shortening a floor of the cab;
   shortening a frame of the cab;
   providing a kit including replacement side panels which are narrower than the existing side panels and a replacement roof which is shorter in length and height than the existing roof;
   installing the replacement side panels on the shortened frame of the cab;
   installing the replacement roof on the shortened frame of the cab; and
   installing modified interior finishing in the cab.

2. The method according to claim 1 wherein the replacement roof has a matching contour to the existing roof to be aesthetically similar in appearance.

3. The method according to claim 1 for a cab including extensions extending rearwardly from the cab in the form of side extensions extending rearwardly from the existing side panels, upper extensions extending rearwardly from the roof above the side extensions and lower extensions extending rearwardly below the side panels, wherein the method includes providing replacement upper extensions and replacement lower extensions in the kit and installing the replacement upper extensions above the existing side extensions rearwardly of the roof and installing the lower extensions below the existing side extensions.

4. The method according to claim 1 for a cab including a rear frame connected to side beams and floor beams extending in the longitudinal direction of the cab, the method including removing a section from the side end floor beams and reconnecting the existing rear frame when shortening the frame of the cab.

5. The method according to claim 4 including removing sections from the beams so that a small portion of each beam remains adjacent the rear frame for reconnection of the beams using a lap weld.

6. The method according to claim 5 including deforming the remaining portions of the beams before reconnection for forming the lap weld.

7. The method according to claim 4 including cutting the floor beams ahead of the shortened floor of the cab.

8. The method according to claim 1 wherein the floor is shortened by keeping an existing portion of the floor and removing a rearward portion of the floor.

9. The method according to claim 8 for a cab including a factory lap joint formed therein, the method including shortening the floor of the cab by separating the floor at the factory lap joint.

10. The method according to claim 1 including removing the existing lower fairings and installing replacement lower fairings which are shorter in length in relation to the existing fairings.

11. The method according to claim 1 including removing the lower fairings and cutting the fairings to be shorter in length before reinstalling the fairings.

12. The method according to claim 1 including removing the existing side panels by drilling out spot welds securing the panels to the frame of the cab.

13. The method according to claim 1 including relocating suspension of the cab adjacent the rear panel thereof forwardly when the frame of the cab is shortened.

14. The method according to claim 1 wherein installing modified interior finishing in the cab includes trimming the existing interior finishing of the cab before reinstallation.

15. A kit for conversion of a cab of a truck from a sleeper cab configuration in which the cab extends rearwardly from an occupant seat of the cab, existing side panels span rearwardly from respective doors of the cab to an existing rear panel of the cab, and a roof of the cab extends upwardly and rearwardly above the existing side panels to a day cab configuration in which the cab is shorter in length than the sleeper cab configuration, the kit comprising:

replacement side panels which are narrower between respective forward and rearward edges than the existing side panels, the forward and rearward edge being configured similarly to the existing side panels; and a replacement roof which is shorter in length and shorter in height than the existing roof.

16. The kit according to claim 15 wherein the replacement roof has a matching contour to the existing roof to be aesthetically similar in appearance.

17. The kit according to claim 15 wherein the replacement side panels and the replacement roof are formed of molded fibreglass.

18. The kit according to claim 15 for a cab including existing fairings extending below the existing side panels, wherein the kit including replacement fairings which are shorter in length than the existing fairings.

19. The kit according to claim 15 for a cab having existing extensions projecting rearwardly from opposing sides of the cab, wherein the kit includes upper extensions being similar in width to the existing extensions and being similar in height to the replacement roof.

20. The kit according to claim 19 for a cab having existing panels below respective doors of the cab and wherein the kit includes lower extensions being similar in width to the existing extensions and being similar in height to the existing panels below the respective doors of the cab.

* * * * *